United States Patent Office 2,971,934
Patented Feb. 14, 1961

2,971,934
AQUEOUS COMPOSITION COMPRISING A SALT OF A MALEIC ANHYDRIDE-DIISOBUTYLENE COPOLYMER, A LINEAR COPOLYMER, AND A WAX

George L. Brown, Moorestown, N.J., and Robert W. Percival, Havertown, Pa., assignors to Rohm & Haas Company, Philadelphia, Pa., a corporation of Delaware No Drawing. Filed Feb. 23, 1956, Ser. No. 567,065

4 Claims. (Cl. 260—28.5)

This invention relates to aqueous coating compositions adapted to produce in improved manner clear or dyed coatings which provide hard, abrasion-resistant surfaces substantially free of blocking tendencies even under severe temperature and humidity conditions. It is particularly concerned with the preparation of such coating compositions as are especially useful for the production of hard, abrasion-resistant non-blocking coatings on bases or substrates which are of substantially non-porous character and are substantially rigid or in use are held in fixed position without being subjected to any appreciable bending forces, such as metals, glass, ceramics, asphalt tile, rubber tile, vinyl resin tile, linoleum, enameled wood surfaces of walls, counters, tables, and floors, or the like.

Heretofore aqueous solutions of thermosetting aminoplast condensates have been applied for the production of clear glossy coatings on rigid substrates of the type mentioned above, but such compositions require the use of substantial amounts of catalyst, generally of acidic character, and require the use of extremely high curing temperatures in order to convert the condensate to insoluble condition in which it is free of blocking. Coatings have been applied by means of water-insoluble linear addition polymers which require no use of an acidic catalyst for converting them to insoluble form. If such polymers are of hard character, that is sufficiently hard to avoid severe blocking (in other words, having a $T_i$ as defined hereinbelow of 35° C. or higher), they must be applied from organic solvent solutions or application of aqueous dispersions thereof must be accompanied by the use of an external plasticizer or considerably elevated temperatures in order to effect coalescence into a continuous film. The application of an aqueous dispersion of such polymers without using an external plasticizer or elevated temperatures deposits discrete particles of the polymer rather than a continuous film thereof.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.².

In accordance with the present invention, it has been found that hard, non-blocking coatings can be obtained without the use of an external plasticizer or pigment by deposition at normal room temperatures or at only moderately elevated temperatures from aqueous dispersions of water-insoluble addition polymers having such hardness that they do not normally coalesce on deposition at normal room temperatures or at moderately elevated temperatures. This can be accomplished with polymers having $T_i$ values from 35° C. to about 100° C. The coating compositions of the present invention do not require high temperatures during the deposition or drying stages, and there is no need of a curing catalyst or a baking operation.

According to the invention, it has been discovered that such aqueous dispersions of hard polymers having a $T_i$ of at least 35° C. can be deposited as continuous films even when they contain no plasticizer, and even at normal room temperatures, such as from 15° to 30° C., provided there is included in the dispersion certain salts of a linear copolymer from maleic anhydride with diisobutylene of the formula $H_3CC(CH_3)_2CH_2C(CH_3)=CH_2$ combined in approximately 1:1 molar ratio, the copolymer having an average molecular weight from about 500 to 5000, and the weight ratio of the hard polymer to the copolymer being between 6:4 to 4:6.

For convenience of reference, the hard linear addition polymer having a $T_i$ of at least 35° C. may be hereinafter referred to as component A or polymer component A whereas the diisobutylene copolymer salt may be referred to as component B or copolymer component B. The polymer component A is generally of high molecular weight averaging at least about 50,000 and generally is from 500,000 up to two or three million.

Since neutralization of the diisobutylene/maleic anhydride copolymer with ammonia produces the corresponding half ammonium salt of the half amide of the copolymer and neutralization with a primary or secondary amine produces the half amine salt of the corresponding half N-substituted or half N,N-disubstituted amide, the term "an ammonium salt" and the term "an amine salt" are meant to include the salts of the half-amides of this copolymer.

The salt of the component B may be an ammonium salt including a simple ammonium salt, a half-amide/half-ammonium salt, and a complex metal ammonium salt, such as the half-amide/half-zinc ammonium salt, or it may be the salt of a volatile water-soluble amine, such as methylamine, dimethylamine, triethylamine, ethylamine, diethylamine, isopropylamine, morpholine, piperidine, and pyrrolidine. The copolymer component B may be produced by conventional procedures such as by copolymerization in an organic solvent, such as xylene or dioxane, in the presence of an initiator, such as benzoyl peroxide, lauroyl, peroxide, cumene hydroperoxide, t-butyl perbenzoate, or the like. The usual procedures for isolating the copolymer may be employed, such as removal of solvent and monomer by distillation or separation of the copolymer, when precipitated, by filtration. If desired, copolymers of substantial homogeneity may be obtained for use in the present invention either by controlling polymerization conditions or by suitable fractionation of a heterogeneous polymer obtained.

The complex zinc ammonium/half-amide salt may be prepared by adding ammonium hydroxide to a solution of zinc acetate or other water-soluble zinc salt, thereby initially precipitating zinc hydroxide, which is redissolved by the addition of more ammonium hydroxide, thereby producing a solution of zinc ammonium acetate or other complex zinc ammonium salt which is then added to the aqueous dispersion of the diisobutylene copolymer either in acid form or in the form of its ammonium salt. This complex zinc ammonium salt of the copolymer has the advantage that it produces a final coating having even greater resistance to water than coatings formed from the simple ammonium or amine salts thereof. The latter coatings, however, have good water-resistance which is adequate for most purposes. Generally, the half-amide/half-ammonium copolymer salts are preferred because of their inexpensiveness since they are formed merely by neutralization of the maleic anhydride/isobutylene copolymer with ammonia. When color is unobjectionable, other complex metal ammonium salts, wherein the metal is copper, cobalt, or nickel, may be used; they are prepared in essentially the same way as the zinc ammonium salt.

It is surprising that an unpigmented aqueous dispersion containing both components A and B without a plasticizer therefor deposit a continuous film at ordinary room temperature since similar aqueous dispersions containing one only of these two components do not do so. Depositions of the aqueous dispersion of component A alone at such temperatures produce a powdery product comprising discrete particles of the polymer whereas such depositions of aqueous dispersions of component B alone produces a flaky product rather than a continuous film. The copolymer salt of maleic anhydride/diisobutylene is also unique in this respect as analogous copolymers in which the diisobutylene is replaced with other related unsaturated hydrocarbons like terpineol, limonene, and dicyclopentadiene cannot produce continuous coating films when they are incorporated into unpigmented aqueous dispersions containing polymer component A without a plasticizer therefor.

The proportions of the copolymer component B and the other polymer component A may generally be from 4 to 6 parts of the former to 6 to 4 parts of the latter, depending upon the particular components mixed. Preferably, the two components are present in approximately equal amounts by weight.

The first-mentioned polymer (component A) may contain a small proportion of hydrophilic groups up to about 2% to 20% by weight thereof in the polymer molecule, but it is generally preferred that the copolymer be formed almost entirely of hydrophobic polymeric units and preferably it contains no more than 2% of units containing hydrophilic groups. The aqueous dispersion of this water-insoluble linear addition polymer may be formed by conventional emulsion polymerization or copolymerization procedures from a single monomer or from a mixture of monomers which form homopolymers or copolymers having a $T_i$ which is at least 35° C. and may be as high as 100° C. or more. Monomers which form softer homopolymers including vinyl acetate and the acrylates of primary and secondary alcohols, such as those having from 1 to 18 carbon atoms and the methacrylates of alcohols having 5 to 18 carbon atoms may be used provided they are copolymerized with sufficient amount of a comonomer which forms hard homopolymers to raise the $T_i$ of the copolymer to at least 35° C. Thus, the methyl, ethyl, propyl, or butyl acrylates which form soft polymers may be copolymerized with such hardening comonomers as the lower alkyl methacrylates in which the alkyl group may have from 1 to 3 carbons, namely the methyl, ethyl, propyl, and isopropyl methacrylates, styrene, acrylonitrile, methacrylonitrile, vinyl chloride, vinylidene chloride, and the like. The amount of hard comonomer that may be copolymerized with one of the soft monomers above depends upon the particular hard and soft comonomers to be copolymerized. The following list gives, for several typical copolymer systems, approximately the maximum amount (weight percentages) of a particular soft comonomer that may be used with a particular hard comonomer to provide copolymers which have $T_i$ values of at least 35° C.

Methyl acrylate 65, methyl methacrylate 35,
Ethyl acrylate 50, methyl methacrylate 50,
Ethyl acrylate 50, styrene 50,
Ethyl acrylate 60, acrylonitrile 40,
n-Propyl acrylate 45, methyl methacrylate 55,
Butyl acrylate 40, methyl methacrylate 60,
Butyl acrylate 45, acryonitrile 55,
Butyl acrylate 40, styrene 60.

Copolymers of up to 15% by weight of butadiene with at least 85% respectively by weight of acrylonitrile or styrene are also useful copolymers having $T_i$ values above 35° C.

The emulsifiers or dispersing agents that may be used for preparing the monomeric emulsions before polymerization or dispersions of the polymer after polymerization may be anionic or non-ionic or a mixture of non-ionic type with an agent of anionic type. The amount of emulsifier or dispersing agent may depend upon the particular monomeric system, but in general is from ½% to 3% by weight of the monomers employed.

Suitable anionic dispersing agents include the higher fatty alcohol sulfates, such as sodium lauryl sulfate, alkylaryl sulfonates, e.g. sodium or potassium isopropylbenzene sulfonates or isopropyl naphthalene sulfonates, alkali metal higher alkyl sulfosuccinates, e.g. sodium octyl sulfosuccinate, sodium N-methyl-N-palmitoyltaurate, sodium oleyl isothionate, alkali metal salts of alkylarylpolyethoxyethanol sulfates or sulfonates, e.g. sodium t-octylphenoxypolyethoxyethyl sulfate having 1 to 5 oxyethylene units.

Suitable non-ionic dispersing agents include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like, or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched-chain amines, such as dodecylamine, hexadecylamine, and octadecylamine, containing 6 to 60 oxyethylene groups; block copolymers of ethylene oxide and propylene oxide comprising a hydrophobic propylene oxide section combined with one or more hyrophilic ethylene oxide sections.

Instead of using one of the anionic or non-ionic emulsifiers mentioned, the maleic anhydride copolymer salt (component B) may be employed as the emulsifier for the monomers in the emulsion copolymerization to form the aqueous dispersion of polymer component A, or it may be used as a dispersing agent for dispersing a finely divided polymer component A to form the aqueous dispersion thereof.

If the copolymer salt is used as the emulsifying or dispersing agent in the preparation of the aqueous dispersion of component A, the amount used may be just sufficient to effect the emulsifying or dispersing actions required, in which event additional copolymer component B is added later to provide the proper relative proportions between components A and B as defined hereinabove. On the other hand, the full amount of the copolymer salt (component B) needed to form the proper proportion thereof in the final aqueous dispersion may be initially introduced to serve as the emulsifying or dispersing agent.

When the aqueous dispersion of the water-insoluble linear addition polymer (component A) is formed by means of one of the other emulsifying agents, it is merely necessary to add to the aqueous dispersion of component A thereby obtained, the proper proportion of the copolymer salt component B. This may be done by first dissolving the free acid form of the maleic anhydride/diisobutylene copolymer in an aqueous solution of ammonia, of a complex metal ammonium salt, such as the complex zinc ammonium acetate mentioned, or of a water-soluble amine, such as one of those mentioned hereinbefore. The solution of the copolymer salt thereby obtained is added to the aqueous dispersion of the component A. The product is an essentially stable dispersion which is relatively non-corrosive since it contains no strongly acid material, such as an acid catalyst, commonly used in thermo-setting aminoplast compositions. The concentration may be from 5 to 50% total solids.

The composition may be applied to the substrate to be coated in any suitable manner, such as by a knife coater or by dipping, roller-coating, spraying, brushing, or the like. After application, it is merely necessary to dry at normal room temperature or to pass the coated substrate through the normal drying equipment. The dispersed polymeric materials coalesce during the drying to form a clear continuous film, which is highly glossy and resistant to water and to blocking. The coating on the substrate obtained from the composition is essentially a mixture of the several components described hereinabove except that the copolymer salt (component B) is substantially converted into free acid and/or amide and/or imide form as the result of the volatilization of ammonia or amine. In the case of the complex zinc ammonium salt, the final copolymer component B remains as an insoluble zinc salt thereof.

The substrates to which the compositions are applied in carrying out the present invention include metals of all kinds, such as iron, steel, aluminum, copper, zinc, nickel, brass, bronze, monel metal, etc.; ceramics, such as ceramic tile bricks, crockery; glassware, stoneware; cement, concrete, stone or brick masonry; asphalt tile, rubber tile, vinyl resin tile, linoleum; enameled surfaces, plaster walls, woodwork, wood flooring, etc.

The aqueous dispersions produce clear, substantially colorless, glossy coatings. However, if desired, the compositions of the present invention may be modified by the incorporation of dyestuffs such as from 0.1% to 1% thereof on the weight polymers.

The non-blocking, mar-resistant, abrasion-resistant, and moisture-resistant characteristics of the coated products are quite valuable. An important advantage of coating with the dispersions of the present invention is the fact that no high temperatures are required, nor is any acid catalyst required to convert the coated films into water-insoluble and non-blocking coatings. The use of the aqueous dispersions also avoids the danger of fire and the toxic effects on operators. It requires no equipment for solvent recovery. The aqueous polymer dispersions of the present invention are self-leveling, so that no auxiliary level agent need be added thereto. The coatings may be re-coated within twenty-four hours or less after drying.

The aqueous dispersions of components A and B may also have a wax introduced therein to provide a modified coating composition especially useful for depositing glossy protective coatings on the various substrates mentioned hereinbefore and especially on furniture and flooring materials, such as wood, enameled, varnished, painted, or otherwise finished, asphalt tile, rubber tile, linoleum tile, and so on. The relative proportions of the total weight of components A and B to wax may be up to 3 to 6 of the former to 1 of the wax and preferably is about 4:1 by weight. For this purpose, it is preferred that the pH of the dispersion be from about 7.2 to 9.5. Suitable alkaline or buffering agents, such as borax, ammonia, or amines, may be introduced to adjust the pH to the desired value.

When the wax is separately dispersed, the dispersing agents mentioned above may similarly be used, but amine salts of soap, such as an ethanolamine oleate or stearate, are most useful.

The waxes or mixtures of waxes which may be used include waxes of a vegetable, animal, synthetic, and/or mineral origin, or mixtures thereof, such as carnauba, candelilla, montan, lanoline, cocoa butter, cottonseed stearin, Japan wax, bayberry, myrtle, mace, palm kernel, beeswax, spermaceti, Chinese insect, mutton tallow, waxes obtained by the hydrogenation of coconut oils, soybean and perhaps of more importance, the mineral waxes such as paraffin, ceresin, montan, ozokerite, etc. Hard natural waxes, such as carnauba and montan waxes, are preferred.

The properties of the coated films obtained from the wax-containing composition may be further modified by the replacement of up to 50% by weight of the wax with wax-soluble resins or gums either natural or synthetic such as terpene-phenolic resins, heat-processed ("run") congo, wood rosin, oxidized petroleum wax and so forth.

In the following examples, which are illustrative of the present invention, the parts given are by weight unless otherwise indicated:

Example 1

An aqueous dispersion is prepared containing, in each 800 parts thereof, 50 parts of a copolymer (having a $T_1$ of about 80° C.) of about 10% by weight of ethyl arcylate with 90% by weight of methyl methacrylate and 50 parts of the half-amide/half-ammonium salt of a 1:1 molar copolymer of maleic anhydride with diisobutylene. Asphalt tile is coated with the composition and dried. The coating is hard, abrasion-resistant and shows no blocking at 170° F. and 75% relative humidity when a plurality of the coated tiles are stacked upon one another under a weight of 10 lbs./sq. in.

Example 2

In the same way as in Example 1, coating compositions are obtained by substituting, for the acrylic copolymer there used, the same amount of polymers as follows:

| Polymer | Percent Ethyl Acrylate | Percent Methyl Methacrylate | Percent Methacrylic Acid |
| --- | --- | --- | --- |
| a | 9.5 | 90 | 0.5 |
| b | 35 | 50 | 15 |
| c | 25 | 55 | 20 |
| d | 10 | 89 | 1 |
| e | 20 | 79 | 1 |
| f | 30 | 69 | 1 |
| g | 40 | 59 | 1 |
| h | 10 | 89 | 1 |
| i | 10 | 89 | 1 |
| j | 0 | 100 | 0 |

The coatings obtained on glass and metals are clear and hard.

Example 3

(a) To 80 parts by weight of an aqueous dispersion prepared by diluting the dispersion of Example 1 to about 12% resin solids content, there is added 20 parts by weight of an aqueous dispersion containing 12% by weight of carnauba wax. The wax dispersion is prepared as follows:

Ten parts by weight of carnauba wax was melted with 1.3 parts of oleic acid and then introduced into 86 parts by weight of water at 95° C. which also contained 1.7 parts by weight of triethanolamine and 1 part by weight of borax. The wax was emulsified by vigorous stirring and allowed to cool. After diluting the copolymer dispersion to a concentration of 12% solids, 80 parts by weight of the copolymer dispersion was added to 20 parts by weight of the wax dispersion.

The resulting coating composition was quite stable on storing and, when wiped on linoleum, rapidly hardened to a tough glossy surface.

(b) When this same procedure is repeated replacing the maleic anhydride/diisobutylene copolymer salt with the same amount of the 10:90 ethyl acrylate/methyl methacrylate copolymer, the coating on floor tile, linoleum, and so on had poor gloss.

Example 4

An aqueous dispersion is prepared containing, in each 600 parts thereof, 40 parts of a copolymer of about 90% by weight of acrylonitrile with about 10% by weight of methyl acrylate and 60 parts of the half-amide/half-ammonium salt of a 1:1 molar copolymer of maleic anhydride with diisobutylene. Asphalt tile is coated with the composition and dried. The coating is hard, abrasion-resistant and shows no blocking at 170° F. and 75% relative humidity when a plurality of the coated tiles are stacked upon one another under a weight of 2¾ lbs./sq. in.

*Example 5*

An aqueous dispersion is prepared containing, in each 700 parts thereof, 60 parts of a copolymer of about 90% by weight of acrylonitrile with about 10% by weight of butadiene and 40 parts of the half-amide/half-complex zinc ammonium salt of a 1:1 molar copolymer of maleic anhydride with diisobutylene. Asphalt tile is coated with the composition and dried. The coating is hard, abrasion-resistant and shows no blocking at 170° F. and 75% relative humidity when a plurality of the coated tiles are stacked upon one another under a weight of 10 lbs./sq. in.

*Example 6*

An aqueous dispersion is prepared containing, in each 800 parts thereof, 50 parts of a copolymer of about 90% by weight of methyl methacrylate with 10% by weight of ethyl acrylate and 50 parts of a diisopropylamine salt of the half-N,N-diisopropylamide of a 1:1 molar copolymer of maleic anhydride with diisobutylene. Asphalt tile is coated with the composition and dried. The coating is hard, abrasion-resistant and shows no blocking at 170° F. and 75% relative humidity when a plurality of the coated tiles are stacked upon one another under a weight of 10 lbs./sq. in.

It is to be understood that changes and variations may be made without departing from the spirit and scope of the invention as defined in the appended claims.

We claim:

1. An aqueous composition comprising (A) polymeric material consisting essentially of (1) a salt of a member selected from the group consisting of ammonium hydroxide and volatile amines with an approximately 1:1 mole ratio conpolymer from maleic anhydride and diisobutylene, said salt having an average molecular weight of about 500 to 5000, and (2) a water-insoluble linear addition copolymer, having a $T_i$ value of 35° C. to about 100° C. determined at 300 kg./cm.$^2$, selected from the group consisting of (a) copolymers of at least one monomer selected from the group consisting of esters of acrylic acid with primary and secondary alkanols having 1 to 18 carbon atoms, and esters of methacrylic acid with an alkanol having 5 to 18 carbon atoms with at least one monomer selected from the group consisting of lower alkyl methacrylates in which the alkyl group has 1 to 3 carbon atoms, styrene, acrylonitrile, methacrylonitrile, vinyl chloride, and vinylidene chloride, and (b) copolymers of at least 85% by weight of a member selected from the group consisting of acrylonitrile and styrene with up to 15% by weight of butadiene, the proportions between (1) and (2) being from 4 to 6 parts by weight of the former to 6 to 4 parts of the latter, and (B) wax, the ratios of the total amount of (1) and (2) to the wax being between 3 to 6 parts of (1) and (2) to each part of the wax.

2. A composition as defined in claim 1 in which the salt is an ammonium salt.

3. A composition as defined in claim 2 in which the salt is a half-amide/half-ammonium salt.

4. An aqueous composition comprising polymeric material consisting essentially of (1) an ammonium salt of an approximately 1:1 mole ratio copolymer from maleic anhydride and diisobutylene, said salt having an average molecular weight of about 500 to 5000, (2) a water-insoluble linear copolymer of methyl methacrylate and ethyl acrylate having a $T_i$ of 35° C. to about 100° C. determined at 300 kg./cm.$^2$, the proportions between (1) and (2) being from 4 to 6 parts by weight of the former to 6 to 4 parts of the latter, and (3) a wax, the ratios of the total amount of (1) and (2) to the wax being between 3 to 6 parts of (1) and (2) to each part of the wax.

References Cited in the file of this patent

UNITED STATES PATENTS

| | | |
|---|---|---|
| 2,378,629 | Hanford | June 19, 1945 |
| 2,596,960 | Schoenholz et al. | May 13, 1952 |
| 2,865,877 | Hatton et al. | Dec. 23, 1958 |
| 2,865,878 | Toothill et al. | Dec. 23, 1958 |